(12) United States Patent
Hardy

(10) Patent No.: US 6,553,061 B1
(45) Date of Patent: Apr. 22, 2003

(54) METHOD AND APPARATUS FOR DETECTING A WAVEFORM

(75) Inventor: William C. Hardy, Dallas, TX (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/779,085

(22) Filed: Feb. 8, 2001

(51) Int. Cl.[7] .............................................. H04L 5/16
(52) U.S. Cl. ...................... 375/220; 375/242; 375/342; 375/356; 375/364; 379/93.06; 379/93.15; 379/93.18; 379/142.14; 370/509; 370/520; 704/212; 704/503
(58) Field of Search ................................. 375/220, 377, 375/340, 342, 343, 254, 241–243, 324, 354, 356, 364, 468, 359; 379/90.01, 93.15, 93.18, 93.01, 93.26, 93.06, 142.13–142.15, 142.18; 370/503, 505, 509, 510, 514, 520; 704/212, 216–218, 500, 503

(56) References Cited

U.S. PATENT DOCUMENTS

| | | | |
|---|---|---|---|
| 5,119,367 A | | 6/1992 | Kawakatsu et al. |
| 5,200,950 A | | 4/1993 | Foglar |
| 5,428,613 A | * | 6/1995 | Spiotta et al. ............... 370/349 |
| 5,479,576 A | | 12/1995 | Watanabe et al. |
| 5,553,059 A | | 9/1996 | Emerson et al. |
| 5,572,570 A | | 11/1996 | Kuenzig |
| 5,715,372 A | | 2/1998 | Meyers et al. |
| 5,742,929 A | | 4/1998 | Kallman et al. |
| 5,825,849 A | | 10/1998 | Garland et al. |
| 5,835,565 A | | 11/1998 | Smith et al. .................... 379/5 |
| 5,867,813 A | | 2/1999 | Di Pietro et al. ........... 704/202 |
| 5,887,027 A | * | 3/1999 | Cohen et al. ................ 375/222 |
| 5,933,475 A | | 8/1999 | Coleman |
| 6,041,048 A | | 3/2000 | Erickson et al. |
| 6,046,979 A | | 4/2000 | Bauman |
| 6,067,350 A | | 5/2000 | Gordon |
| 6,094,464 A | * | 7/2000 | Ebringer et al. ............. 375/342 |
| 6,111,949 A | | 8/2000 | Sheets et al. |
| 6,282,192 B1 | | 8/2000 | Murphy et al. |
| 6,128,291 A | | 10/2000 | Perlman et al. |
| 6,147,988 A | | 11/2000 | Bartholomew et al. |
| 6,172,970 B1 | | 1/2001 | Ling et al. |
| 6,243,373 B1 | | 6/2001 | Turock |
| 6,256,304 B1 | * | 7/2001 | Vayrynen ..................... 370/350 |
| 6,256,608 B1 | | 7/2001 | Malvar ........................ 704/230 |
| 6,275,797 B1 | | 8/2001 | Randic |
| 6,285,653 B1 | | 9/2001 | Koeman et al. |
| 6,304,634 B1 | | 10/2001 | Hollier et al. ........... 379/22.02 |
| 6,356,601 B1 | | 3/2002 | Chen et al. |
| 6,370,120 B1 | | 4/2002 | Hardy ......................... 370/252 |
| 6,377,636 B1 | | 4/2002 | Paulraj et al. |

* cited by examiner

*Primary Examiner*—Stephen Chin
*Assistant Examiner*—Dac V. Ha

(57) ABSTRACT

A device for detecting a predetermined waveform in a received signal and synchronizing the detected waveform to the predetermined waveform is disclosed. The device includes a memory element for storing a reference set of encoded values. The reference set representing an encoded version of the predetermined waveform. An encoder is used to PCM encode the signal to obtain sets of encoded values representing the received signal. A processor calculates the statistical correlation coefficient of the reference set and the signal sets. The processor then determines the maximum statistical correlation coefficient. The predetermined waveform is detected in the signal if the maximum statistical correlation coefficient is greater than or equal to a predetermined threshold value. The device provides a compact, inexpensive, and fast method for detecting a known reference waveform in a received signal. This method can also be used to synchronize the signal to the known reference waveform for a point-by-point comparison of the two signals.

62 Claims, 6 Drawing Sheets

METHOD AND APPARATUS FOR DETECTING A WAVEFORM

BACKGROUND OF THE INVENTION

1. Field of the Invention

The present invention relates generally to telecommunications, and particularly to a method and device for evaluating the quality of signals transmitted in a network.

2. Technical Background

Telephone connections have always been subject to impairments in the form of noise, attenuation, distortion, cross-talk and echo. Such impairments are particularly common to analog portions of the network, such as subscriber loops and frequency domain multiplexing equipment. Digital transmission alleviates many of these problems but also introduces quantization noise and other waveform distortions resulting from data transmission errors. Thus, a typical telephone connection completed over a long distance network is exposed to impairments, regardless of the transmission technology or combination of transmission technologies employed.

Such impairments can produce conditions that a telephone customer will find objectionable or intolerable. It is particularly frustrating when the malfunctioning piece of equipment is an automated system, such as a menu-driven voice response unit. When there is a high incidence of problems with a given unit, customers may simply become irritated and hang-up. This translates into a loss of business for the vendor employing the malfunctioning equipment. If the problem is associated with the quality of the network, the vendor may be tempted to change carriers. Thus, the quality of telephone connections is a major factor affecting the reputation and marketability of long distance telephone services.

In order to measure transmission quality over a telecommunications link, it is frequently necessary or useful to compare a received signal to a known reference waveform. To perform this comparison, the received signal must be synchronized with the reference signal. The received signal is then compared with a perfect version of the signal to obtain a point-by-point determination of how the received amplitude signal differs from the perfect version of the signal. In another scenario requiring such synchronization, it is desirable to be able to determine if a certain bong-tone or pure-tone was transmitted. In yet another scenario, a vendor's equipment may be programmed to transmit a particular voice announcement, or in a menu-driven system, a series of tones and/or voice announcements. The received signal must be processed to automatically determine whether the vendor's equipment is functioning properly. What is needed is a method and device for detecting a waveform, and comparing the detected waveform to a reference waveform with proper synchronization.

In one approach that has been taken, a frequency domain analysis employing Fast-Fourier-Transforms (FFT) is used to compare a received signal to a known reference waveform. This approach necessitates the use of a digital signal processor (DSP). While DSP systems certainly are effective, DSP integrated circuits (IC) are expensive. It would be very difficult to upgrade an existing microprocessor based Telephone Quality Measurement System (TQMS).

What is needed is a compact, inexpensive, and fast method for synchronizing and comparing a received signal to a known reference waveform. What is also needed is a way to upgrade existing measurement systems without adding unnecessary components and expense. Preferably, the upgrade can be accomplished by merely changing or adding software.

SUMMARY OF THE INVENTION

The present invention provides a compact, inexpensive, and fast method for synchronizing and comparing a received signal to a known reference waveform. The present invention can also be used to upgrade existing test and measurement systems without adding unnecessary components and expense. In some circumstances, the present invention can be used to upgrade an existing system by adding software.

One aspect of the present invention is a device for detecting a predetermined waveform in a signal. The device includes a memory element for storing at least one reference set of encoded values, the at least one reference set representing an encoded version of the predetermined waveform. An encoder is adapted to encode the signal to thereby obtain at least one signal set of encoded values. A processor is coupled to the memory element and the encoder. The processor is operative to calculate at least one statistical correlation coefficient of the reference set and the at least one signal set, whereby the predetermined waveform is detected in the signal if the at least one statistical correlation coefficient is greater than or equal to a predetermined threshold value.

In another aspect, the present invention includes a method for detecting a predetermined waveform in a signal. The method includes providing at least one reference set of encoded values, the at least one reference set representing an encoded version of the predetermined waveform. The signal is encoded to thereby obtain at least one signal set of encoded values. At least one statistical correlation coefficient of the at least one reference set and the at least one signal set is calculated, whereby the predetermined waveform is detected in the signal if the at least one statistical correlation coefficient is greater than a predetermined threshold value.

In another aspect, the present invention includes a device for detecting a predetermined waveform in a signal transmitted by a telecommunications system in a network. The device includes an interface unit coupled to the network. The interface unit is operative to automatically establish a telephonic connection between the device and the telecommunications system and capture the signal transmitted by the telecommunications system. An encoder is coupled to the interface unit. The encoder is operative to encode the signal to thereby obtain at least one signal set of encoded values. A processor is coupled to the encoder, the processor being operative to calculate at least one statistical correlation coefficient of at least one reference set and the at least one signal set, whereby the predetermined waveform is detected in the signal if the at least one statistical correlation coefficient is greater than a predetermined threshold value.

In another aspect, the present invention includes a computer readable medium having computer executable instructions for performing a method. The method includes obtaining a reference set of encoded values, the reference set representing an encoded version of a predetermined waveform. A signal is encoded to thereby obtain at least one signal set of encoded values. At least one statistical correlation coefficient of the reference set and the at least one signal set is calculated. The at least one statistical correlation coefficient is compared with a predetermined threshold value, whereby it is determined that the signal includes the predetermined waveform if the at least one statistical correlation coefficient is greater than a predetermined threshold value.

In another aspect, the present invention includes a device for determining whether a signal is a pure tone. The device includes an encoder operative to encode a portion of the signal to thereby obtain a reference set of PCM encoded values. A processor is coupled to the encoder. The processor is programmed to: calculate a second-differences of the signal to thereby obtain a second-differences set of encoded values; calculate a statistical correlation coefficient of the reference set and the second-differences set; and compare the statistical correlation coefficient to a predetermined threshold, whereby the signal is determined to be a pure tone if the statistical correlation coefficient is greater than the predetermined threshold value.

In another aspect, the present invention includes a method for determining whether a signal is a pure tone. The method includes encoding at least a portion of the signal to thereby obtain a reference set of encoded values. The second-differences of the signal is calculated to thereby obtain a second-differences set of encoded values. A statistical correlation coefficient of the reference set and the second-differences set is calculated. The statistical correlation coefficient is compared with a predetermined threshold, whereby the signal is determined to be a pure tone if the statistical correlation coefficient is greater than the predetermined threshold value.

In another aspect, the present invention includes a device for detecting a predetermined waveform in a signal. The device includes a memory element for storing at least one reference set of encoded values, the at least one reference set representing an encoded version of the predetermined waveform. An encoder is adapted to encode the signal to thereby obtain at least one signal set of encoded values. A processor is programmed to encode at least a portion of the signal to thereby obtain a reference set of encoded values, calculate the second-differences of the signal to thereby obtain a second-differences set of encoded values, calculate a statistical correlation coefficient of the reference set and the second-differences set, and compare the statistical correlation coefficient to a predetermined threshold. The signal is determined to be a pure tone if the statistical correlation coefficient is greater than the predetermined threshold value.

In another aspect, the present invention includes a method for synchronizing a received signal with a predetermined waveform. The method includes providing a reference set of encoded values, the reference set representing an encoded version of the predetermined waveform. The signal is encoded to thereby obtain a plurality of encoded values. A plurality of correlation coefficients is calculated for the reference set and each of a plurality of signal sets. A maximum value correlation coefficient of the plurality of correlation coefficients is determined. The reference set is aligned with a signal set corresponding to the maximum value correlation coefficient.

In another aspect, the present invention includes a device for detecting a predetermined waveform in a signal. The device includes a memory element for storing at least one reference set of encoded values, the at least one reference set representing an encoded version of the predetermined waveform. An encoder is adapted to encode the signal to thereby obtain at least one signal set of encoded values. A processor is programmed to provide a reference set of encoded values, the reference set representing an encoded version of the predetermined waveform. The processor is also programmed to encode the signal to thereby obtain a plurality of encoded values, calculate a plurality of correlation coefficients for the reference set and each of a plurality of signal sets, determine a maximum value correlation coefficient of the plurality of correlation coefficients, and align the reference set with a signal set corresponding to the maximum value correlation coefficient.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE PREFERRED EMBODIMENTS

Figure 1:
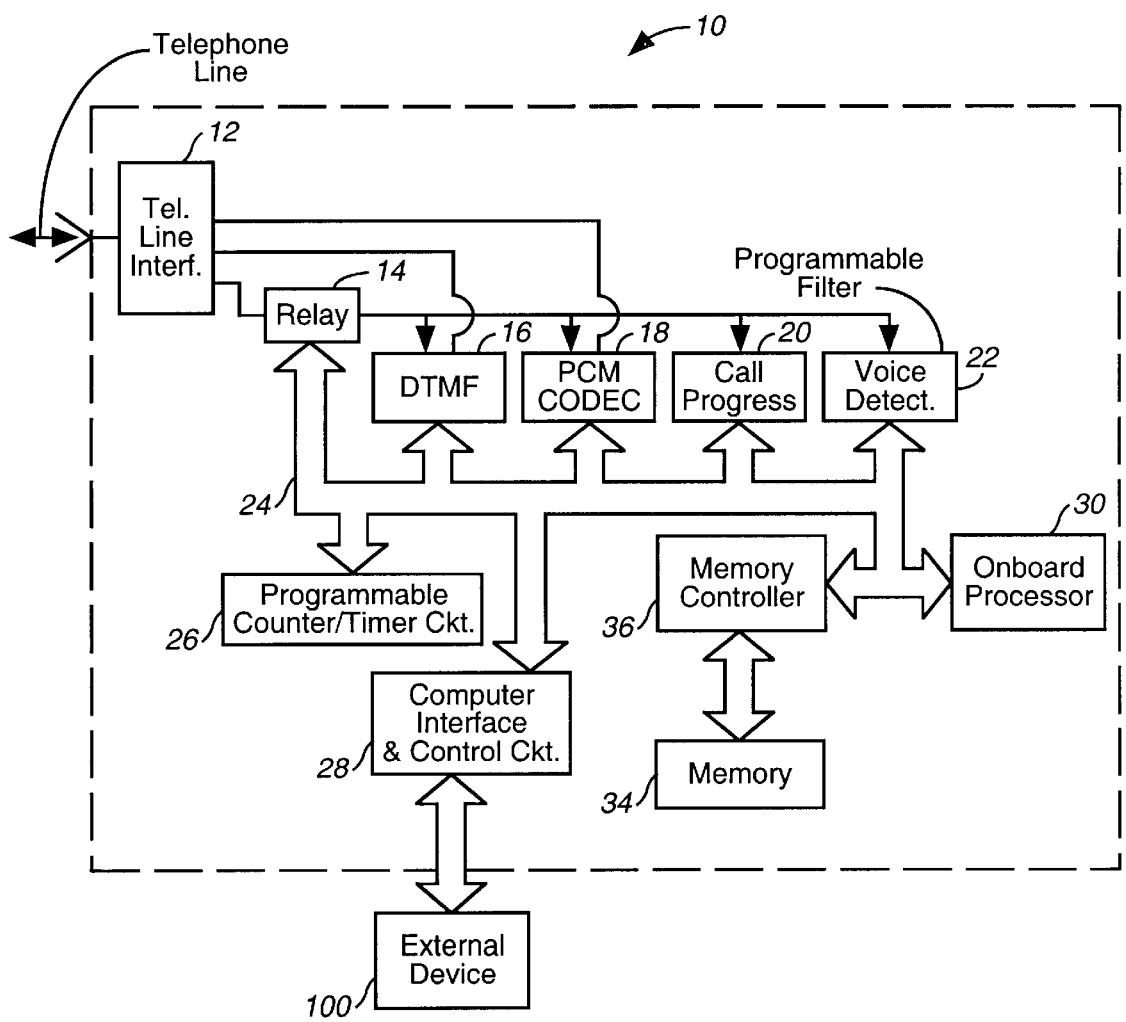
FIG. 1 is a block diagram of a device for detecting a predetermined waveform in a signal in accordance with the present invention.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the device for detecting and synchronizing a predetermined waveform to a signal of the present invention is shown in FIG. 1, and is designated generally throughout by reference numeral 10.

In accordance with the invention, the present invention includes a device 10 for detecting a predetermined waveform in a signal. The device includes a memory element 34 for storing at least one reference set of encoded values, the at least one reference set representing an encoded version of the predetermined waveform. An encoder 18 is adapted to encode the signal to thereby obtain at least one signal set of encoded values. A processor 30 is coupled to the memory element and the encoder. The processor is operative to calculate at least one statistical correlation coefficient of the reference set and the at least one signal set, whereby the predetermined waveform is detected in the signal if the at least one statistical correlation coefficient is greater than or equal to a predetermined threshold value. The signal waveform is synchronized to the reference waveform sample by setting the starting point in the signal waveform to the at least one signal set that produces the greatest statistical correlation coefficient. After the received signal and the reference signal are synchronized, a point-by-point comparison of these signals can be performed. Thus, the present invention provides a compact, inexpensive, and fast method for synchronizing and comparing a received signal to a known reference waveform. The present invention can also be used to upgrade existing test and measurement systems without adding unnecessary components and expense. In some circumstances, the present invention can be used to upgrade an existing system by merely adding software.

As embodied herein, and depicted in FIG. 1, a block diagram of device 10 for detecting a predetermined waveform in a signal in accordance with the present invention is disclosed. Device 10 includes telephone line interface 12 which connects device 10 to a telephone line in the network. Interface 12 is coupled to relay 14. Relay 14 is a conventional relay that distributes signals received from interface 12 to DTMF 16, PCM codec 18, call progress detector 20, and voice detector 22. Each of the above listed components are internally coupled to system bus 24. Device 10 also includes programmable counter/timer circuit 26. System bus 24 is also coupled to computer interface circuit 28, processor 30, and memory controller 36. Memory controller 36 is coupled to memory 34, which is used to store both data and computer executable instructions.

Telephone line interface 12 may be of any suitable type, but by way of example, interface 12 includes an integrated circuit, such as a Motorola MC34010P, coupled to isolation transformers. The isolation transformers prevent grounding problems. Signals from the network are translated by interface 12 into signals having a correct format and amplitude. Interface 12 may also include a buffer amplifier and an adjustable potentiometer to provide optimal signal levels.

DTMF (dual tone multi-frequency) transceiver 16 is operative to generate and detect audible tones associated with a telephone network. DTMF 16 is also adapted to generate DTMF dialing tones to initiate a call through the telephone line coupled to interface 12. DTMF 16 detects DTMF tones received from the telephone line via interface 12.

PCM codec transceiver 18 uses a standard digitization scheme to band limit voice frequencies to the 300–3300 Hz frequency band. Codec 18 performs an A/D conversion of an analog voice message using a $\mu$-law companding scheme. When sampling the analog waveform, larger amplitudes are compressed relative to the smaller amplitudes, providing an equivalent 12-bit accuracy within an 8-bit digital word. The 8-bit words generated by codec 18 can be stored in a RAM portion of memory 34, or in a memory resident in processor 30. In one embodiment, codec 18 includes a semiconductor IC manufactured by SGS Thompson or by the National Semiconductor Company having the product number ETC5056, or equivalent. The receiver portion of codec 18 will be discussed in more detail below in conjunction with FIG. 2.

Call Progress controller 20 is operative to continuously monitor and interactively communicate with the remote equipment under evaluation. Controller 20 is tuned to a particular frequency band (e.g., 300–630 Hz) where most of the fundamental energies of the call progress information reside. Controller 20 monitors the frequency band of interest and looks for the duration of on and off times, and classifies the examined signal as one of the above noted tones. Call progress controller 20 is programmed to interactively respond to a remote telecommunications system under evaluation. It is adapted to respond to call progress signals such as dial tone signals, busy signals, ring back signals, bong signals, beep signals, PBX signals, responder signals, FAX signals, modem signals, and voice. The duration of incoming signals such as dial tone, ring back, busy, or fast busy are recorded. The call progress controller is also operative to generate a plurality of dialing patterns in response to the remote telecommunications system being evaluated.

Voice detect circuit 22 is fabricated using standard operation amplifier circuits. It detects signals in the band between 750 Hz and 4 KHz. When a voice waveform is detected, the output within this frequency band is amplified and translated into a digital signal by codec 18. Voice detection may also trigger a response such that a test message is retrieved from memory 34 and converted into an analog signal by codec 18 for transmission over the telephone connection. In another embodiment, PCM codec 18 digitizes all incoming signals and effects a D/A conversion of all transmitted signals. Voice detection is all that is needed, so that controller 20 can determine when voice is detected and effect instructions accordingly.

In yet another embodiment, the output of a detector showing power/no power on a number of different filters to accomplish the functions described for call progress controller and voice detection circuit 22. Reference is made to U.S. Pat. No. 5,241,584, which is incorporated herein by reference as though fully set forth in its entirety, for a more detailed explanation of this component.

Programmable counter/timer 26 may be of any suitable type of circuit that provides timing signals of various frequencies as required by the components in device 10. A timing crystal is coupled to programmable counter/timer 26. All of the frequencies generated by counter/timer 26 are synchronous with the base frequency generated by the timing crystal. Programmable counter/timer 26 generates the system clock signal distributed to system components by bus 24.

Memory 34 may be of any suitable type, but by way of example, memory 34 includes a read/write random access memory (RAM) used in data processing and data I/O, and a read only memory for storing device 10 programming instructions used by processor 30. The memory used to store the programming instructions can be implemented using a DRAM, ROM, PROM, EEPROM, hard drive, diskettes, compact disk, or any other computer readable medium. Memory controller 36 controls the requests from the various components in device 10 on bus 24. A memory map of memory 34 will be discussed in more detail below in conjunction with FIG. 4.

Computer interface 28 is adapted to communicate with external device 100. The programming instructions stored in memory 34 can be completely replaced or partially replaced with new instructions down loaded from external device 100. Further, reference data corresponding to new reference waveforms can be stored. For example, if device 10 is to be used for evaluating a voice response unit that uses the word "eastern" in one of its responses, data representing the reference waveform for "eastern" can be stored in an appropriate place in memory 34. As discussed below, in another embodiment of the present invention, the data interpretation is performed by external device 100. In this case, interface 28 transmits the acquired data to external device 100 for further processing.

In one embodiment, processor 30 is implemented using an 8-bit semiconductor processor chip such as the 80486 IC manufactured by Intel. Although the calculation for determining the correlation coefficient of two random variables is relatively straightforward and does not require much processing power, an 8-bit processor is required in the on-board processing embodiment. Essentially, the present invention can be implemented using the lowest cost components on the market. However, one of ordinary skill in the art will recognize that 16-bit, or even 32-bit machines can be used to implement processor 30, depending on speed, cost and other design considerations. Those of ordinary skill in the art will also recognize that processor 30 can be implemented using an application specific integrated circuit (ASIC). Thus, in this embodiment, the data acquisition and data interpretation functions are integrated using a single chip or firmware integrated board.

In another embodiment processor 30 is implemented using a 4-bit processor. In this alternative embodiment, processor 30 merely controls and effects the recording of the received signal so less processing power is required. The recording is transmitted to external host processor 100. One benefit of this approach is that the data interpretation software can be easily amended. In the first embodiment discussed above, the firmware resident in memory 34 has to be changed when amending the data interpretation function.

In the following discussion, the following convention will be used. The encoded values for the reference waveform are designated as $x_i$. The signature includes a collection of N indices whose designated values $x_i$ form reference set X of PCM encoded values. The encoded values for the signal set Y=y(t) received from the network are designated as $y_j$. Encoded values $y_j$ are used to form signal sets $(S_j)$ of PCM encoded values including values of the form $y_{j+i-1}$, where "j" is the index for Y and "i" is the index for reference set X. As will be discussed below, reference set X is used with signal sets $(S_j)$ to calculate the correlation coefficients.

Figure 2:
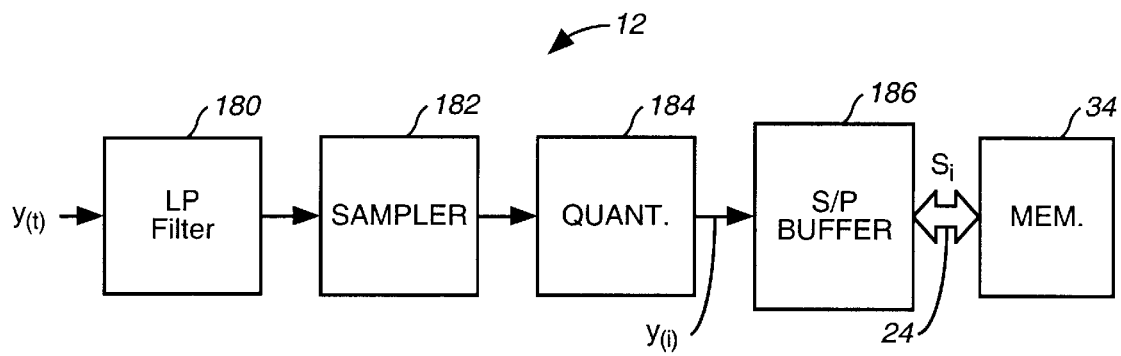
FIG. 2 is a detail view of a portion of the PCM codec in accordance with the present invention.

As embodied herein and depicted in FIG. 2, a detail view of the receiver portion of codec 18 is disclosed. The receiver portion of codec 18 includes low pass filter 180, which as discussed above, band limits the signal to a frequency band between 300 Hz and 3300 Hz. Filter 180 is coupled to sampler 182. Sampler 182 is connected to quantizer 184. Quantizer 184 is connected to serial-to-parallel buffer 186 which interfaces with memory 34, via bus system 24. Sampler 182 samples band-limited signal y(t) with a train of narrow rectangular pulses to closely approximate an instantaneous sampling process. According to Nyquist's theorem, the sampling rate must be greater than twice the highest frequency component of the band-limited signal y(t). In this embodiment, the highest frequency component is 3300 Hz. Quantizer 184 is operative to convert the analog signal samples provided by sampler 182 into digital form in accordance with a $\mu$-law compression format. In one embodiment the $\mu$-law compression format is a $\mu$-255 compression format. Since eight bits are required to encoded 256 discrete value levels, an eight-bit byte format is used in this format. Serial-to-parallel buffer 186 receives a stream of encoded values $y_i$ from quantizer 184. Serial-to-parallel buffer 186 is used to organize values $y_i$ into sets $(S_i)$ having the same size as the reference set. Subsequently, sets $(S_i)$ are written into memory 34 for further processing.

Figure 3:
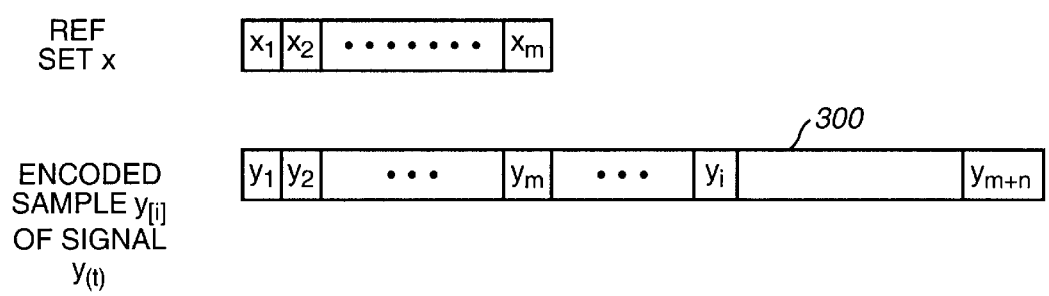
FIG. 3 is a diagrammatic comparison of the reference set of encoded PCM values and the encoded sample of the received signal.

FIG. 3 is a diagram depicting reference set X of encoded PCM values as compared with the encoded values $y_i$ of the received signal y(t) output by quantizer 184. Reference set X of encoded values $x_i$ need only to be large enough to contain the signature of the reference signal. In a voice signal, the reference signal x(t) need only contain the unique pattern of phonemes that are of interest. For example, the entire phrase "eastern standard time" does not have to be captured if the key word is "eastern." Similarly, only a few cycles of a pure tone are needed to form reference set X. However, encoded message 300 containing values yi, may be of any size. If y(t) is known to include reference message x(t), the task is to synchronize y(t) with x(t) using the correlation coefficient. In this scenario, message 300 needed only be as large enough to ensure that x(t) is included. In another scenario, it may not be known if x(t) is in signal y(t). Thus, y(t) may be longer.

Figure 4:
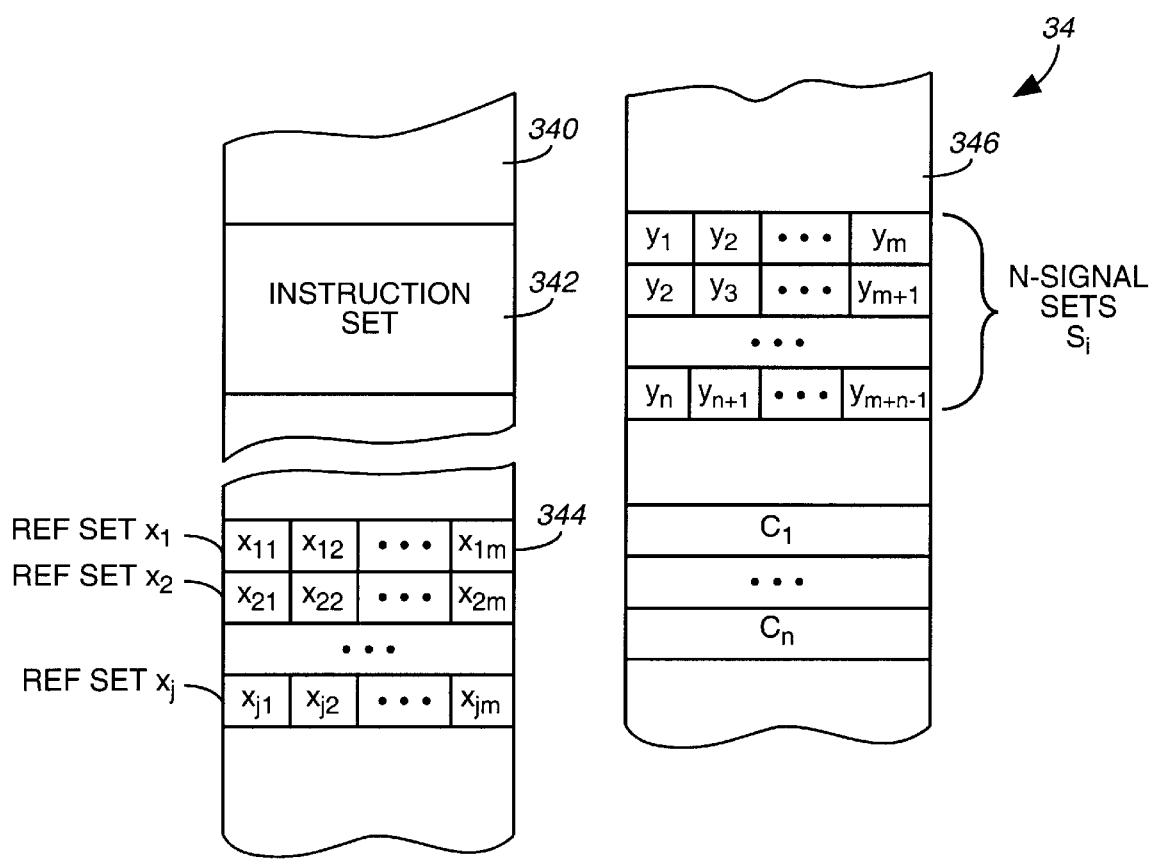
FIG. 4 is a diagram of the memory map of the device in accordance with the present invention.

FIG. 4 is a diagram of the memory map of the device in accordance with one embodiment of the present invention. Memory 34 includes read only portion 340 which contains the instruction set 342 that is executed by processor 30 (FIG. 1). One of ordinary skill in the art will recognize that memory portion 340 may be of any suitable type, but there is shown by way of example a PROM. Depending on cost, size, flexibility, and other design considerations, memory portion 340 may be implemented using DRAM, ROM, EEPROM, diskettes, hard drive, compact disks, or by using some other type of memory. Memory 34 also includes a block of memory 344 for reference set X. In the example shown in FIG. 4, memory block 344 includes a several reference sets R. This is useful in a scenario where device 10 is employed to evaluate a menu driven voice response unit. In the evaluation process, device 10 may be required to detect a plurality of voice signals, beeps, bong-tones, or other such signals. Reference set X for each of these signals can be stored in block 344 for retrieval by processor 30. One of ordinary skill in the art will recognize that in alternate embodiments reference set X represents selected samples of amplitude from the predetermined waveform. These samples may comprise a contiguous segment of the digitally encoded reference signal or a well-defined selection of points in a continuous segment of the digitally encoded signal. Memory 340 also includes random access portion 346 which is used to store the N-signal sets $(S_i)$ of signal y(t) and the N-calculated correlation coefficients $C_i$. Each signal set S includes the same number of values included in reference set X. In the example depicted in FIG. 4, each set includes "m" values, "m" being an integer. Note that signal sets $(S_i)$ are formed on a sliding basis: the first signal set $(S_i)$ has m values beginning with encoded value $y_i$; the second signal set $(S_2)$ has m values beginning with encoded value $y_2$; and the Nth signal set $(S_N)$ has m values beginning with encoded value $Y_N$.

Figure 5:
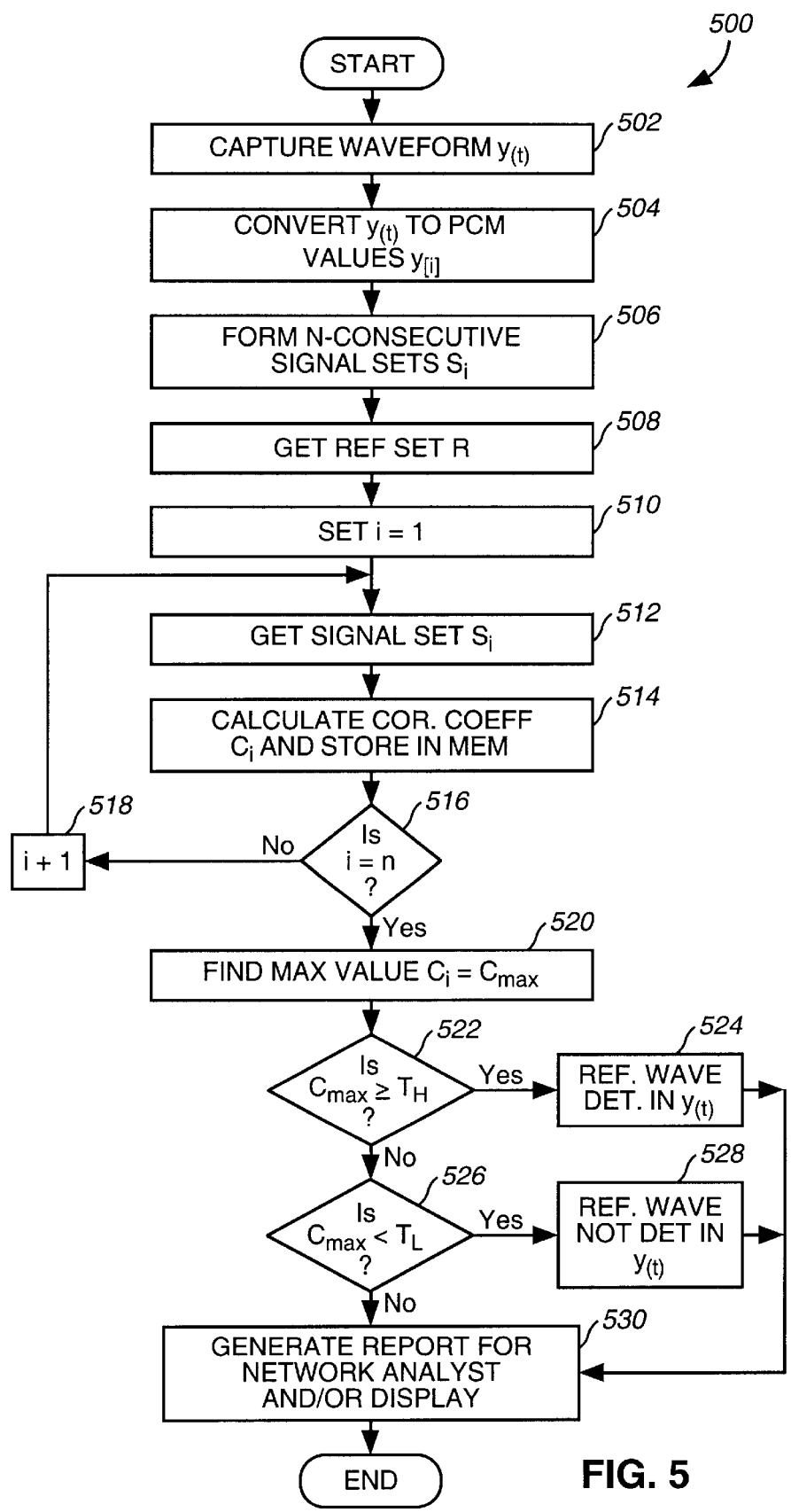
FIG. 5 is a flow chart showing a method for detecting a predetermined waveform in a received signal in accordance with the present invention.

As embodied herein and depicted in FIG. 5, a flow chart showing a method for detecting a predetermined waveform x(t) in a received signal y(t) is disclosed. In step 502, signal y(t) is received by telephone interface 12 and provided to codec 18. Codec 18 converts y(t) into values $y_1$, as described above. In step 506, the N-consecutive signal sets $(S_i)$ are formed as described above and shown in FIG. 4. Processor 30 retrieves reference set X in step 508. In step 510, the incrementing variable "i" is set equal to "1" to begin executing the processing loop that is used to calculate the correlation coefficients $C_i$.

In the first iteration of the loop, signal set ($S_1$) is retrieved from RAM 346. In step 514, the correlation coefficient $C_1$ for Reference set X and signal set ($S_1$) is calculated and stored in RAM 346. The correlation coefficient is defined as:

$$C_i = \frac{Cov[X, Y]}{\sigma_x \sigma_y}, \quad (1)$$

where Cov[X,Y] is the covariance of X and Y, $\sigma_x$ is the standard deviation of x, and $\sigma_y$ is the standard deviation of y. If the correlation coefficient is equal to one (1), x and y are perfectly correlated. The degree of correlation diminishes as the correlation coefficient approaches zero (0). A correlation coefficient of 0.9 or greater indicates that x(t) is included in y(t).

In steps 516 and 518, the loop is incremented to i=2. Steps 512 and 514 are repeated in the second iteration of the next loop to thereby calculate the second correlation coefficient $C_1$ for reference set X and signal set ($S_1$). This iterative process continues until i=N becomes true. In subsequent step 520, processor 30 performs a sort routine to determine the maximum correlation coefficient $C_{MAX}$.

In step 522, the maximum correlation coefficient $C_{MAX}$ is compared with the threshold value $T_H$. Typically, threshold value $T_H$ is set to 0.9. If $C_{MAX} \geq T_H$, processor 30 concludes that reference waveform x(t) is in the signal set ($S_i$) that was used to produce the maximum correlation coefficient $C_{MAX}$. If $C_{MAX}$ is determined to be $C_6$, e.g., the Correlation Coefficient for (X, $S_6$), then set $S_6$ includes reference set X. Thus, x(t) is detected in that portion of y(t) that corresponds to $S_6$. The method for synchronizing x(t) and y(t) requires an additional step of aligning set $S_6$ (in the above example) to reference set X. Processor 30 is then poised to perform a point-by-point analysis of reference set X and set $S_6$. Alternatively, $S_6$ can be converted back into a continuous time signal $y_c(t)$ and then compared to x(t) using a point-by-point time domain analysis.

If $C_{MAX} < T_H$, then processor 30 compares $C_{MAX}$ with threshold value $T_L$. Typically, threshold value $T_H$ is set to 0.3. If $C_{MAX} < T_L$, then processor 30 concludes that reference signal x(t) is not present in received signal y(t). If $T_L \leq C_{MAX} \leq T_H$, then x(t) may or may not be present in received signal y(t). In step 530 a report and/or a display is generated for use by a network analyst. This is especially important because in this scenario, it is unclear as to whether y(t) includes x(t).

Figure 6:
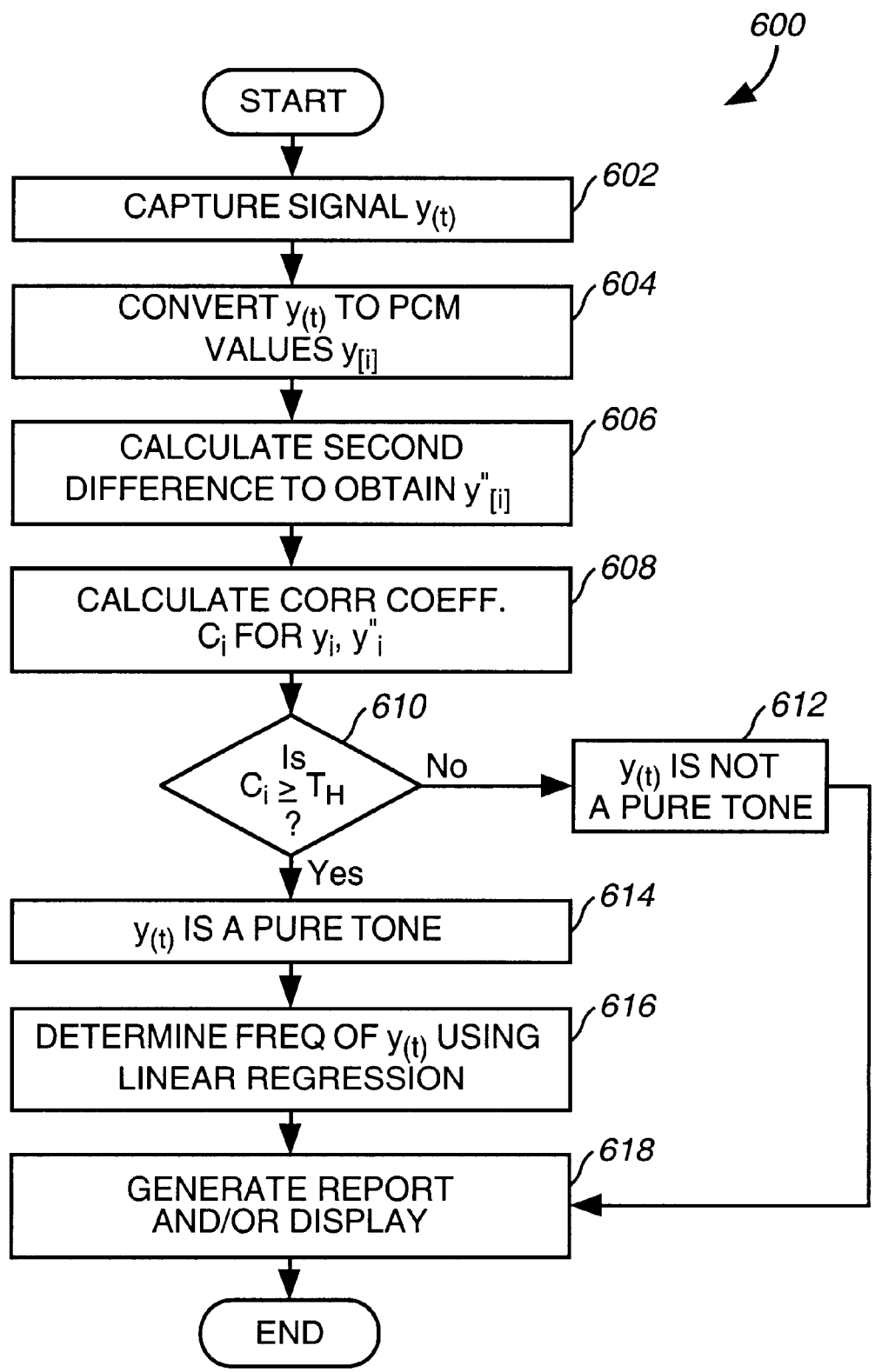
FIG. 6 is a flow chart showing a method for detecting a pure tone in accordance with the present invention.

As embodied herein and depicted in FIG. 6, a flow chart showing an alternate method for detecting a pure tone is disclosed. One of ordinary skill in the art will recognize that the method shown in FIG. 5 can also be used to detect a pure tone. In step 602, signal y(t) is received by telephone interface 12 and provided to codec 18. In step 604, codec 18 converts y(t) into values $y_i$, as described above. In step 606, processor 30 calculates the second-differences to obtain $y''_i$. Second differences are a discrete form of the second derivative obtained by setting y"(i)=y(i+1)−2y(i)+y(i−1). A pure tone can be described mathematically as a sine wave. The first derivative of a sine function, is a cosine function. The first derivative of a cosine function, and the second derivative of a sine function, is a sine function. Thus, if y(t) is a pure tone, the second-differences $y''_i$ of $y_i$ should be the same as $y_i$, except for a constant, in which case the expected correlation coefficient is 1.0. In step 608, the correlation coefficient for $y''_i$ and $y_i$ is calculated. In step 610, $C_i$ is compared to $T_H$. If y(t) is a pure tone, $C_i$ will be between 0.9 and 1.0. If y(t) is a pure tone, step 616 determines the frequency of y(t) using a linear regression routine to determine the aforementioned constant in the relationship between $y''_i$ and $y_i$. In step 618, a report and/or display is generated detailing the results.

Figure 7:
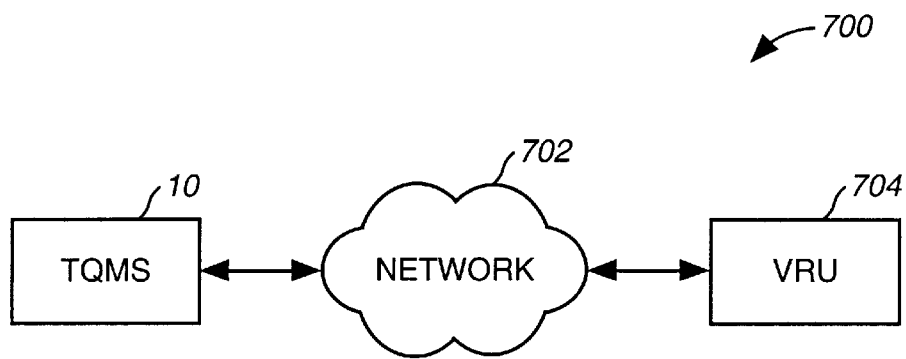
FIG. 7 is an example of the device being used to evaluate a menu driven voice response unit in accordance with the present invention.

FIG. 7 is an example of the device being used to evaluate a menu driven voice response unit in accordance with the present invention. In connection 700, TQMS device 10 is coupled to network 702. Network 702 is coupled to voice response unit 704. One of ordinary skill in the art will recognize that network 702 can be a circuit switched network, a packet switched network, or a hybrid network. In accordance with the present invention, processor 30 provides DTMF 16 and call progress controller 20 with the telephone number of VRU 704 to establish a voice connection. Call progress controller 20 is adapted to respond to call progress signals and voice. In doing so, device 10 sequences through the entire menu of VRU 704 to thereby evaluate its performance with respect to playing the correct recording in response to each caller selection.

Figure 8:
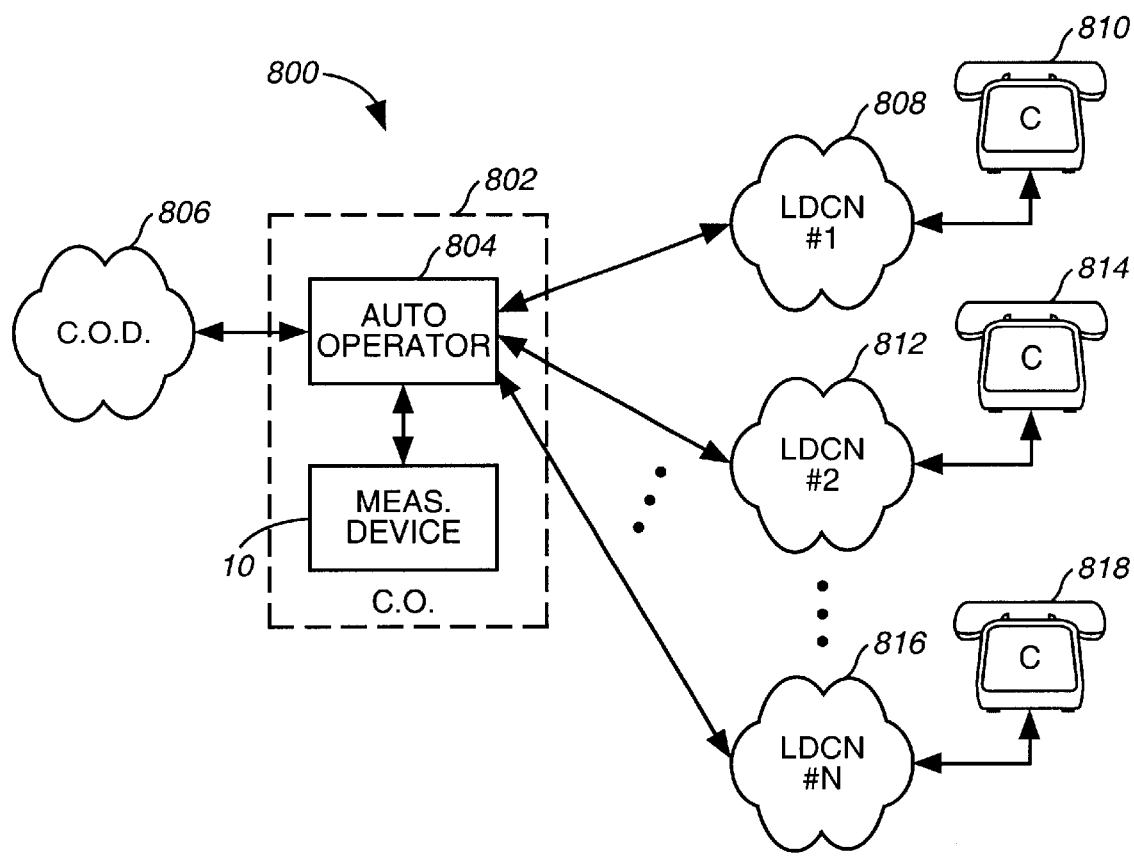
FIG. 8 is an example of the device being used with an automated operator in a call distribution device in accordance with the present invention.

FIG. 8 is an example of device 10 being used with a call distribution device in accordance with the present invention. In connection 800, device 10 is coupled to automated operator 804 which is disposed in central office 802. Automated operator 804 is programmed to equally distribute calls from central office district 806 to long distance carrier networks 808–816. Each long distance carrier network (LDCN) is characterized by a distinctive bong-tone. As automated operator 804 connects each customer to a long distance carrier network, device 10 is programmed to detect the bong tone in accordance with the methods described above, and keep track of the distribution of calls amongst the carriers.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A device for detecting a predetermined waveform in a signal, the device comprising:

a memory element for storing at least one reference set of encoded values, the at least one reference set representing an encoded version of the predetermined waveform;

an encoder adapted to encode the signal to thereby obtain at least one signal set of encoded values; and a processor coupled to the memory element and the encoder, the processor being operative to calculate at least one statistical correlation coefficient of the reference set and the at least one signal set, whereby the predetermined waveform is detected in the signal if the at least one statistical correlation coefficient is greater than or equal to a predetermined threshold value.

2. The device of claim 1, wherein the at least one reference set and the at least one signal set include PCM encoded values.

3. The device of claim 1, wherein the memory further comprises:

a first memory portion coupled to the processor, the first memory portion being operative to store computer-executable instructions, the instructions including instructions for calculating the statistical correlation coefficient; and a second memory portion coupled to the processor, the second memory portion being operative to store the at least one reference set.

4. The device of claim 1, wherein the memory is selected from the group consisting of DRAM, RAM, ROM, PROM, EEPROM, at least one diskette, at least one compact disk, and a hard drive.

5. The device of claim 1, wherein the at least one signal set includes a plurality of signal sets, the processor calculating a plurality of statistical correlation coefficients.

6. The device of claim 5, wherein the processor selects a maximum correlation coefficient from the plurality of statistical correlation coefficients for comparison to the predetermined threshold value.

7. The device of claim 6, wherein the threshold value is 0.9.

8. The device of claim 1, wherein the at least one reference set of encoded values includes encoded values representing selected samples of amplitude from the predetermined waveform, the selected samples being a contiguous segment of encoded values or selected points in the contiguous segment of encoded values.

9. A method for detecting a predetermined waveform in a signal, the method comprising:
providing at least one reference set of encoded values, the at least one reference set representing an encoded version of the predetermined waveform;
encoding the signal to thereby obtain at least one signal set of encoded values; and
calculating at least one statistical correlation coefficient of the at least one reference set and the at least one signal set, whereby the predetermined waveform is detected in the signal if the at least one statistical correlation coefficient is greater than a predetermined threshold value.

10. The method of claim 9, wherein the at least one reference set of encoded values includes encoded values representing selected samples of amplitude from the predetermined waveform, the selected samples being a contiguous segment of encoded values or selected points in the contiguous segment of encoded values.

11. The method of claim 9, wherein the at least one reference set and the at least one signal set includes PCM encoded values.

12. The method of claim 9, wherein the step of encoding comprises the steps of:
filtering the signal to thereby obtain a band-limited signal excluding frequency components greater than W-Hz, wherein W is a number;
sampling the band-limited signal at rate greater than 2 W to thereby produce a plurality of signal samples; and
quantizing the plurality of signal samples in accordance with a $\mu$-law compression format.

13. The method of claim 12, wherein the $\mu$-law compression format is a $\mu$-255 compression format, such that each encoded value is encoded in an eight-bit byte format.

14. The method of claim 9, wherein the at least one signal set of encoded values includes a plurality of encoded values.

15. The method of claim 14, wherein the step of calculating further comprises:
forming N-consecutive signal sets using the plurality of encoded values, such that a first signal set begins with a first encoded value, a second signal set begins with a second encoded value, and the Nth signal set begins with an Nth encoded value, whereby each of the N-consecutive signal sets, and the at least one reference set, include an identical number of encoded values;
iteratively calculating the statistical correlation coefficient for the at least one reference set and each of the N-consecutive signal sets, whereby N statistical correlation coefficients are obtained;
selecting a maximum value statistical correlation coefficient from the N statistical correlation coefficients; and
comparing the maximum value statistical correlation coefficient to the predetermined threshold value.

16. The method of claim 15, wherein the step of comparing includes determining that the predetermined waveform is in the signal if the maximum value statistical correlation coefficient is greater than or equal to the predetermined threshold value.

17. The method of claim 15, wherein the predetermined threshold value is equal to 0.9.

18. The method of claim 15, further comprising:
determining a signal set of the N-consecutive signal sets that corresponds to the maximum value statistical correlation coefficient; and
aligning the signal set of the N-consecutive signal sets that corresponds to the maximum value statistical correlation coefficient to the reference set, whereby the reference set and the N-consecutive signal sets are synchronized.

19. The method of claim 15, further comprising:
comparing the maximum value statistical correlation coefficient to a lower threshold value if the maximum value statistical correlation coefficient is smaller than the predetermined threshold value; and
determining that the predetermined waveform is not in the signal if the maximum value statistical correlation coefficient is smaller than the lower threshold value.

20. The method of claim 19, further comprising the step of generating a user readable analysis.

21. The method of claim 19, wherein the user readable analysis includes a graphical representation.

22. The method of claim 19, wherein the user readable analysis includes a verbal description.

23. A device for detecting a predetermined waveform in a signal transmitted by a telecommunications system in a network, the device comprising:
an interface unit coupled to the network, the interface unit being operative to automatically establish a telephonic connection between the device and the telecommunications system and capture the signal transmitted by the telecommunications system;
an encoder coupled to the interface unit, the encoder being operative to encode the signal to thereby obtain at least one signal set of encoded values; and
a processor coupled to the encoder, the processor being operative to calculate at least one statistical correlation coefficient of at least one reference set and the at least one signal set, whereby the predetermined waveform is detected in the signal if the at least one statistical correlation coefficient is greater than a predetermined threshold value.

24. The device of claim 23, wherein the at least one signal set and the at least one reference set include a set of PCM encoded values.

25. The device of claim 24, wherein the at least one reference set is an encoded version of the predetermined waveform.

26. The device of claim 25, wherein the at least one reference set is formed by taking a second-differences of the signal.

27. The device of claim 23, wherein the interface unit further comprises:
a telephone line interface physically coupled to the network;

a call progress controller coupled to the telephone line interface, the call progress controller being operative to interactively communicate with the telecommunications system; and a data acquisition unit coupled to the call progress controller, the data acquisition unit being operative to store queries and responses received from the telecommunications system.

28. The device of claim 27, wherein the call progress controller interactively communicates by responding to call progress signals.

29. The device of claim 28, wherein the call progress signals include dial tone signals, busy signals, ring back signals, bong signals, beep signals, PBX signals, responder signals, FAX signals, modem signals, and voice.

30. The device of claim 28, wherein the call progress controller is operative to generate a plurality of dialing patterns in response to the telecommunications system.

31. The device of claim 27, wherein the telecommunications system is a voice response unit.

32. The device of claim 27, wherein the telecommunications system is a menu driven voice response unit.

33. The device of claim 27, wherein the data acquisition unit is operative to record the signals transmitted by the telecommunications system.

34. The device of claim 27, wherein the data acquisition unit is operative to schedule calling at least one telephone number assigned to the telecommunications system.

35. The device of claim 34, wherein the at least one telephone number includes a plurality of telephone numbers assigned to a plurality of telecommunications systems.

36. The device of claim 27, wherein the data acquisition unit is operative to generate an analysis including a description of the signals received from the telecommunications system, and calculations performed by the processor.

37. The device of claim 36, wherein the analysis is displayed on an electronic display unit.

38. The device of claim 23, wherein the predetermined waveform represents a voice.

39. The device of claim 23, wherein the predetermined waveform represents a bong tone.

40. The device of claim 23, wherein the predetermined waveform represents a pure tone.

41. The device of claim 23, wherein the at least one signal set of encoded values includes a plurality of encoded values.

42. The device of claim 41, wherein the processor is programmed to:

form N-consecutive signal sets using the plurality of encoded values, such that a first signal set begins with a first encoded value, a second signal set begins with a second encoded value, and the Nth signal set begins with an Nth encoded value, whereby each of the N-consecutive signal sets, and the at least one reference set, include an identical number of encoded values;

iteratively calculate the statistical correlation coefficient for the at least one reference set and each of the N-consecutive signal sets, whereby N statistical correlation coefficients are obtained;

select a maximum value statistical correlation coefficient from the N statistical correlation coefficients; and compare the maximum value statistical correlation coefficient to the predetermined threshold value.

43. The device of claim 42, wherein the processor is programmed to determine that the predetermined waveform is in the signal if the maximum value statistical correlation coefficient is greater than or equal to the predetermined threshold value.

44. The device of claim 42, wherein the processor is programmed to:

align a signal set corresponding to the maximum value statistical correlation coefficient to the reference set; and perform a point-by-point comparison of each value in the aligned signal set to each value if the reference set.

45. The device of claim 42, wherein the processor is further programmed to:

compare the maximum value statistical correlation coefficient to a lower threshold value if the maximum value statistical correlation coefficient is smaller than the predetermined threshold value; and determine that the predetermined waveform is not in the signal if the maximum value statistical correlation coefficient is smaller than the lower threshold value.

46. The device of claim 45, wherein the predetermined threshold value is approximately 0.9.

47. The device of claim 45, wherein the lower threshold value is approximately 0.3.

48. The device of claim 23, wherein the device is coupled to a personal computing platform.

49. The device of claim 23, wherein the device is coupled to an OEM equipment.

50. A computer readable medium having computer executable instructions for performing a method, the method comprising:

obtaining a reference set of encoded values, the reference set representing an encoded version of a predetermined waveform;

encoding a signal to thereby obtain at least one signal set of encoded values;

calculating at least one statistical correlation coefficient of the reference set and the at least one signal set; and comparing the at least one statistical correlation coefficient with a predetermined threshold value, whereby it is determined that the signal includes the predetermined waveform if the at least one statistical correlation coefficient is greater than a predetermined threshold value.

51. The method of claim 50, wherein the computer readable medium is selected from the group consisting of DRAM, ROM, PROM, EEPROM, at least one diskette, a hard drive apparatus, or at least one compact disk.

52. The method of claim 50, wherein the step of encoding comprises the steps of:

filtering the signal to thereby obtain a band-limited signal excluding frequency components greater than W-Hz, wherein W is a number;

sampling the band-limited signal at rate greater than 2 W to thereby produce a plurality of signal samples;

quantizing the plurality of signal samples in accordance with a $\mu$-law compression format.

53. The method of claim 50, wherein the at least one signal set of encoded values includes a plurality of encoded values.

54. The method of claim 53, wherein the step of calculating further comprises:

forming N-consecutive signal sets using the plurality of encoded values, such that a first signal set begins with a first encoded value, a second signal set begins with a second encoded value, and the Nth signal set begins with an Nth encoded value, whereby each of the N-consecutive signal sets includes an identical number of encoded values as are included in the at least one reference set;

iteratively calculating the statistical correlation coefficient for the at least one reference set and each of the N-consecutive signal sets, whereby N statistical correlation coefficients are obtained;

selecting a maximum value statistical correlation coefficient from the N statistical correlation coefficients; and comparing the maximum value statistical correlation coefficient to the predetermined threshold value.

55. The method of claim 54, wherein the step of comparing comprises:

aligning a signal set corresponding to the maximum value statistical correlation coefficient to the reference set; and performing a point-by-point comparison of each value in the aligned signal set to each value in the reference set.

56. The method of claim 54, further comprising:

comparing the maximum value statistical correlation coefficient to a lower threshold value if the maximum value statistical correlation coefficient is smaller than the predetermined threshold value; and determining that the predetermined waveform is not in the signal if the maximum value statistical correlation coefficient is smaller than the lower threshold value.

57. A device for determining whether a signal is a pure tone, the device comprising:

an encoder operative to encode a portion of the signal to thereby obtain a reference set of PCM encoded values; and a processor coupled to the encoder, the processor being programmed to, calculate a second-differences of the signal to thereby obtain a second-differences set of encoded values, calculate a statistical correlation coefficient of the reference set and the second-differences set, and compare the statistical correlation coefficient to a predetermined threshold, whereby the signal is determined to be a pure tone if the statistical correlation coefficient is greater than the predetermined threshold value.

58. The device of claim 57, wherein the predetermined threshold value is greater than or equal to 0.9.

59. A method for determining whether a signal is a pure tone, the method comprising:

encoding at least a portion of the signal to thereby obtain a reference set of encoded values;

calculating the second-differences of the signal to thereby obtain a second-differences set of encoded values;

calculating a statistical correlation coefficient of the reference set and the second-differences set; and comparing the statistical correlation coefficient to a predetermined threshold, whereby the signal is determined to be a pure tone if the statistical correlation coefficient is greater than the predetermined threshold value.

60. A device for detecting a predetermined waveform in a signal, the device comprising:

a memory element for storing at least one reference set of encoded values, the at least one reference set representing an encoded version of the predetermined waveform;

an encoder adapted to encode the signal to thereby obtain at least one signal set of encoded values; and a processor programmed to encode at least a portion of the signal to thereby obtain a reference set of encoded values, calculate the second-differences of the signal to thereby obtain a second-differences set of encoded values, calculate a statistical correlation coefficient of the reference set and the second-differences set, and compare the statistical correlation coefficient to a predetermined threshold, whereby the signal is determined to be a pure tone if the statistical correlation coefficient is greater than the predetermined threshold value.

61. A method for synchronizing a received signal with a predetermined waveform, the method comprising:

providing a reference set of encoded values, the reference set representing an encoded version of the predetermined waveform;

encoding the signal to thereby obtain a plurality of encoded values;

calculating a plurality of correlation coefficients for the reference set and each of a plurality of signal sets;

determining a maximum value correlation coefficient of the plurality of correlation coefficients; and aligning the reference set with a signal set corresponding to the maximum value correlation coefficient.

62. A device for detecting a predetermined waveform in a signal, the device comprising:

a memory element for storing at least one reference set of encoded values, the at least one reference set representing an encoded version of the predetermined waveform;

an encoder adapted to encode the signal to thereby obtain at least one signal set of encoded values; and a processor programmed to provide a reference set of encoded values, the reference set representing an encoded version of the predetermined waveform, encode the signal to thereby obtain a plurality of encoded values, calculate a plurality of correlation coefficients for the reference set and each of a plurality of signal sets, determine a maximum value correlation coefficient of the plurality of correlation coefficients, and align the reference set with a signal set corresponding to the maximum value correlation coefficient.

* * * * *